United States Patent Office 2,733,781
Patented Feb. 7, 1956

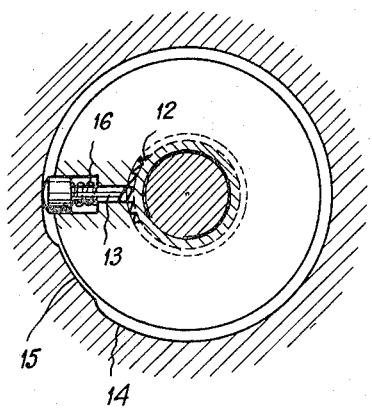
Fig. 2
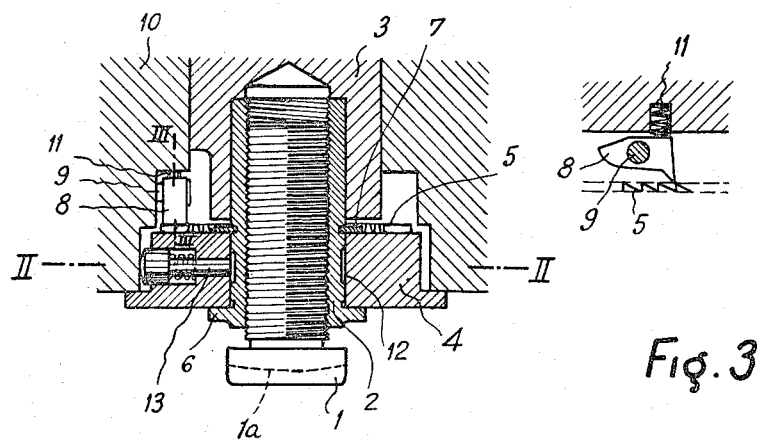
Fig. 3
Fig. 1

2,733,781

AUTOMATIC SLACK ADJUSTER FOR BRAKES

Louis Charles Brisson, Vineuil, France

Application August 13, 1952, Serial No. 304,178

Claims priority, application France August 18, 1951

2 Claims. (Cl. 188—196)

This invention relates to brakes provided with means for automatically taking-up the wear of the lining of the brake shoe or shoes, and particularly to brakes provided with an automatic device for taking-up the wear of the type comprising a threaded member actuated by a toothed gear driven by a mechanism which advances it by one tooth at each application of the brake. The invention has for its object an improved wear taking-up device of this type.

In order to solve practically, in a satisfactory manner, the problem of the taking-up of the wear of brake shoes, the solution must meet the following double condition:

1. It must take up the play corresponding to the wear of the lining of the shoe or shoes;

2. It must not take up any play arising out of a difference of expansion of the brake shoe or shoes and of the brake drum.

A simple arrangement which gives very good results is known, comprising an escapement device which operates as soon as the play to be taken up exceeds a certain amount which is predetermined, the play taken up at each escapement of the device being fixed and small.

A device of this kind is known, comprising a threaded member controlling the wear taking-up, actuated by a toothed wheel driven by an escapement mechanism which causes it to advance one tooth at each application of the brake, thereby advancing the threaded member by a very small fraction of the pitch of the thread.

Such a device functions very well when the masses of the shoe or shoes and of the drum are moderate so that their temperature are quickly reduced to a negligible amount.

When these masses are important, however, as in the case of heavy-weight vehicles, such as device can no longer function satisfactorily, because the time required for the equalization, even only approximate, of the temperatures is very long and it is possible that there will be during this time, under certain driving conditions, a relatively large number of applications of the brake with consequential operation of the wear taking-up device each time, with the result that there will be an objectionable tightening of the brake shoe or shoes against the brake drum, after cooling of the whole, in the no-braking position.

The simplest way of improving the working of such an arrangement for taking-up the wear would be to decrease the amount of play taken up at each escapement of the mechanism; if, in fact, one could diminish it sufficiently, one would find oneself again dealing with the case of the brake shoe or shoes and brake drum of small masses.

Unfortunately, it is difficult to sufficiently diminish the pitch of the thread of the member which is generally used for taking up the play under control of the escapement device; an increase in the number of teeth of the escapement arrangement, whihc would have the desired effect, would have to be considerable, in fact, much greater than is practicaly possible, to achieve a satisfactory result. Even by using a differential screw arrangement, the resulting pitch would be still too large.

According to the invention, to remedy these drawbacks, I provide an arrangement for taking-up the wear of the lining of a brake shoe or shoes of the type referred to, characterised by a mechanism adapted to render the escapement of a tooth of the toothed gear effective in actuating the wear taking-up device only once during a whole revolution of the said toothed gear.

Preferably, the member actuating the chain of brake shoes when the brake is applied is a threaded socket adapted to be rotated by one step when the escapement of a tooth of the toothed gear aforesaid is rendered effective by a ratchet arrangement which operates only once for a whole revolution of the said toothed gear, the said socket member actuating the chain of brake shoes through the intermediary of a threaded member screwed into the said socket and prevented from rotating with the latter, so that it advances longitudinally by a very small fraction of the pitch of the thread whenever the threaded socket rotates by one step of the ratchet arrangement.

Preferably, the factor which determines whether the escapement of one tooth of the toothed gear aforesaid will be effective in rotating the threaded socket by one step is a spring controlled finger mounted on the toothed gear, brought in operation by a cam surface on the fixed support of the whole device and engaging one of the teeth of a ratchet wheel solid with the threaded socket.

Other characteristic features and advantages of the present invention will appear during the description which follows with reference to the accompanying drawing on which is represented diagrammatically and in the way of example only a preferred embodiment of the invention.

In this drawing:

Fig. 1 is a longitudinal, axial section of the device according to the invention;

Fig. 2 is a transverse section along II—II of Fig. 1;

Fig. 3 is a view of detail, being a partial section along III—III of Fig. 1.

In the figures, 1 is a threaded member screwed into an internaly threaded socket 2 and prevented from turning with the said socket by any suitable means such as a device which can, for instance, be similar ot that shown in Figure 2 of my previous U. S. Patent No. 2,131,369, the head of said threaded member being provided with a slot 1a in which a part of the adjacent shoe can be inserted. The socket 2 and member 1 constitute an intermediate member between the chain of brake shoes (not shown) in the one hand, and the controlling member 3, on the other hand, this controlling member being actuated by the operator through an arrangement for brake control of any known type, whether it be mechanical, pneumatic or hydraulic.

Around the socket 2 is mounted rotatively a disc member 4 on which are disposed the teeth 5 of the toothed crown of the escapement device, adapted to be engaged by a pawl 8 pivoted at 9 on the fixed support 10 of the mechanism, under the thrust of a spring 11 housed in the said support. This disc member 4 is held between a flange 6 of the socket and a maintaining washer 7, so that it is carried along in translation with the controlling member 3, on which the socket is rotatively mounted, while this disc member 4 can turn with respect to the socket 2. It will be seen that, when an application of the brake takes place, the controlling member 3 descends and, with it, the whole mechanism constituted by the socket 2, disc member 4 and threaded member 1, while the pawl 8 remains in position on the support 10, momentarily out of engagement with the toothed crown 5.

In accordance with the invention, the socket 2 is provided with a groove 12 provided with circumferential ratchet teeth (Fig. 2) adapted to be engaged by the chamfered end of a finger 13 slidably mounted in a bore in the disc member 4. When the other end of this finger, which bears against the internal surface 14 of the support 10, passes over a boss 15 on this surface, the finger is pushed into engagement with the ratchet teeth 12 against the thrust of a spring 16, which normally maintains it out of engagement with these teeth when the boss 15 is in another position.

In operation, when braking, the member 3 is displaced downwards (Fig. 1) under the action of the operating device of the brake, carrying with it the socket 2 and the member 1. The socket 2, in its turn, carries down the disc member 4, thereby moving the toothed crown 5 away from the pawl 8, as explained above. When the brake pedal is released, the whole returns into the position shown in Fig. 1 and the toothed crown returns in engagement with the pawl 8, which causes the disc member 4 to turn through an angle corresponding to one tooth.

Should the boss 15 happen to be in any position such as that shown in Fig. 2, in which it does not push the finger 13 in engagement with the ratchet teeth 12, this rotation of the disc member 4 does not entail any rotative movement of the socket 2 and, consequently, no movement of the member 1 in the direction of the taking-up of the play.

When a certain number of applications of the brake have been effected, the member 4 having each time turned through an angle corresponding to one tooth, as it has been explained above, there comes a moment (once in each rotation of this member 4) when the boss 15 comes under the head of the finger 13, which is then pushed in engagement with the teeth 12 on the socket 2, thereby rendering the member 4 solid with the socket 2; the latter, consequently, is carried along with the rotation of the member 4 and this causes a relative motion of the member 1 with respect to the socket 2, resulting in a taking-up of the play. This only takes place once during a complete rotation of the member 4, instead of at every application of the brake, as is the case with the brakes in use at the present time, with the drawbacks which have been explained.

It is seen that, in this manner, one carries into effect, in a very simple manner, an arrangement which permits to take up the wear of the lining of the shoes, without this taking up of the play being excessive and producing an objectionable tightening of the brake shoes against the brake drum in the non-braking position.

What I claim is:

1. In a device for taking-up the wear of brake shoes, a controlling member for said brake shoes, a fixed support for said controlling member in which said controlling member is movable, an internally threaded socket rotatively mounted on said controlling member, a threaded member cooperating with said internally threaded socket, one end of said threaded member being engaged in said socket and the other end being arranged so as to be connected to one of said shoes in a fixed angular relationship with respect thereto, a disc member rotatively mounted on said socket, a crown of teeth on said disc member, means for causing said disc member to advance one tooth of said toothed crown at every application of the brake beyond a predetermined travel of said controlling member and means for locking said disc member to said socket once in every revolution of said disc member.

2. A device as claimed in claim 1, wherein said means for locking said disc member to said socket once in every revolution of said disc member comprise a cylindrical housing for said device in said fixed support, a ring of ratchet teeth on the said socket, a spring actuated finger housed in said disc member, one end of said spring actuated finger engaging the teeth of said ratchet, the other end of said spring actuated finger controllably bearing against the internal cylindrical wall of the housing in said fixed support, and a cam surface on said internal cylindrical wall for moving the end of said finger and to push it into engagement with the teeth of the ratchet, thereby locking the said ratchet with the disc member at least once in each complete revolution of the latter to cause the said socket to be moved by the ratchet when advancing one tooth.

References Cited in the file of this patent

UNITED STATES PATENTS

| | | |
|---|---|---|
| 1,875,065 | Lyman | Aug. 30, 1932 |
| 1,971,643 | De Lavaud | Aug. 28, 1934 |
| 1,998,533 | Brisson | Apr. 23, 1935 |
| 2,077,940 | La Fitte | Apr. 20, 1937 |
| 2,131,369 | Brisson | Sept. 27, 1938 |
| 2,152,041 | Goepfrich | Mar. 28, 1939 |

FOREIGN PATENTS

| | | |
|---|---|---|
| 525,487 | Great Britain | Aug. 29, 1940 |